(12) United States Patent
Jahnke

(10) Patent No.: US 6,494,575 B1
(45) Date of Patent: *Dec. 17, 2002

(54) COLORED CONTACT LENS HAVING VERY NATURAL APPEARANCE

(75) Inventor: Richard L. Jahnke, Villa Park, IL (US)

(73) Assignee: Wesley-Jessen Corporation, Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/419,882

(22) Filed: Apr. 11, 1995

Related U.S. Application Data

(63) Continuation of application No. 07/984,817, filed on Dec. 3, 1992, now Pat. No. 5,414,477, which is a continuation of application No. 07/704,260, filed on May 22, 1991, now abandoned, which is a continuation of application No. 07/430,222, filed on Nov. 1, 1989, now abandoned.

(51) Int. Cl.$^7$ ................................................. G02C 7/04
(52) U.S. Cl. ..................... 351/162; 351/160 H; 351/177
(58) Field of Search .......................... 351/160 R, 160 H, 351/161, 162, 177

(56) References Cited

U.S. PATENT DOCUMENTS

| | | |
|---|---|---|
| D211,757 S | 7/1968 | Urbach |
| 3,454,332 A | 7/1969 | Siegel |
| 3,536,386 A | 10/1970 | Spivack |
| 3,557,261 A | 1/1971 | Wichterle |
| 3,679,504 A | 7/1972 | Wichterle |
| 3,712,718 A * | 1/1973 | LaGrand et al. ............ 351/162 |
| 3,794,414 A | 2/1974 | Wesley |
| 3,846,199 A | 11/1974 | Cappelli ...................... 156/61 |
| 4,447,474 A | 5/1984 | Neefe |
| 4,460,523 A | 7/1984 | Neefe |
| 4,472,327 A | 9/1984 | Neefe |
| 4,555,372 A | 11/1985 | Kunzler et al. ............... 264/2.1 |
| 4,558,931 A * | 12/1985 | Fuhrman ..................... 351/162 |
| 4,582,402 A | 4/1986 | Knapp |
| 4,634,449 A | 1/1987 | Jenkins |
| 4,639,105 A | 1/1987 | Neefe ......................... 351/162 |
| 4,640,805 A | 2/1987 | Neefe |
| 4,668,240 A | 5/1987 | Loshaek |
| 4,681,412 A | 7/1987 | Lemelson |
| 4,701,038 A | 10/1987 | Neefe |
| 4,704,017 A | 11/1987 | Knapp |
| 4,719,657 A | 1/1988 | Bawa |
| 4,720,188 A | 1/1988 | Knapp ......................... 351/177 |
| 4,744,647 A | 5/1988 | Meshel et al. |
| 4,824,688 A | 4/1989 | Covington ..................... 427/2 |
| 4,840,477 A | 6/1989 | Neefe |

(List continued on next page.)

FOREIGN PATENT DOCUMENTS

| | | |
|---|---|---|
| CA | 710 230 | 5/1965 |
| CA | 815 956 | 11/1966 |
| DE | 62926 | 7/1968 |

(List continued on next page.)

OTHER PUBLICATIONS

Wulf Ehrich and Daniel Epstein, "Color Atlas of Contact Lenses" (Theime Medical Publishers, Inc., 1988), pp. 8, 9, 120 and 121, particulary Fig. 21 at p. 9 and the accompanying text at p. 8.

(List continued on next page.)

Primary Examiner—Scott J. Sugarman
(74) Attorney, Agent, or Firm—Brinks Hofer Gilson & Lione

(57) ABSTRACT

A colored contact lens having a very natural appearance is disclosed. The inventive lens has a non-opaque pupil section and iris section that is at least partially opaque and comprised of two portions. A first portion, generally located on the outside of the iris section, has a first shade. A second portion, generally located on the inside of the iris section has a second shade. A jagged border separates the two portions. A third iris section and second jagged border are also disclosed. In some embodiments portions of the iris section may be non-opaque.

11 Claims, 10 Drawing Sheets

U.S. PATENT DOCUMENTS

| | | | |
|---|---|---|---|
| 4,867,552 A | 9/1989 | Neefe | |
| 4,889,421 A | 12/1989 | Cohen | |
| 4,946,269 A | 8/1990 | Magdassi | |
| 4,981,487 A | 1/1991 | da Costa | 8/507 |
| 5,018,849 A | 5/1991 | Su et al. | 351/162 |
| 5,034,166 A | 7/1991 | Rawlings et al. | 264/1.7 |
| 5,106,182 A | 4/1992 | Briggs et al. | 351/162 |
| 5,116,112 A | 5/1992 | Rawlings | 351/162 |
| 5,120,121 A | 6/1992 | Rawlings et al. | |
| 5,160,463 A | 11/1992 | Evans et al. | |
| 5,302,978 A | 4/1994 | Evans et al. | 351/162 |
| 5,414,477 A * | 5/1995 | Jahnke | 351/162 |

FOREIGN PATENT DOCUMENTS

| | | |
|---|---|---|
| DE | 1629343 | 3/1972 |
| EP | 0 158 999 | 10/1985 |
| EP | 187137 | 7/1986 |
| EP | 0 262 832 | 4/1988 |
| EP | 272101 | 6/1988 |
| EP | 0 309 154 | 3/1989 |
| EP | 352134 | 1/1990 |
| EP | 357062 | 3/1990 |
| EP | 0 369 942 | 5/1990 |
| EP | 384632 | 8/1990 |
| EP | 0 390 443 | 10/1990 |
| EP | 0 484 044 | 5/1992 |
| FR | 1499774 | 9/1967 |
| FR | 2 074 870 | 10/1971 |
| GB | 1163617 | 9/1969 |
| GB | 1237629 | 6/1971 |
| GB | 2 006 114 | 5/1979 |
| GB | 2 202 540 | 9/1988 |
| JP | A57/120912 | 7/1982 |
| WO | 8 303 480 | 10/1983 |
| WO | WO 85/04679 | 10/1985 |
| WO | 8 504 679 | 10/1985 |
| WO | WO 91/06886 | 5/1991 |

OTHER PUBLICATIONS

Peter Höfer, paper read at the 21st Annual Convention of the International Society of Contact Lens Specialists in Jerusalem, "Weiche Kontaktlinsen Mit Kunstlicher Irif" ("Soft Contact Lenses with Artificial Iris") and subsequently published in "National Optician Journal" in Nov. 1981 (particularly Photograph 14)(with translation).

Werner Otto Hoffmannbeck, "Lentes de Contacto—teoria e aplicacôes", p. 451 (McGraw Hill, 1977)(with translation).

James E. Key II and Carole Mobley, "Cosmetic Hydrogel Lenses For Therapeutic Purposes", published in "Contact Lens Forum" 18, 20, 22 (Apr. 1987)(particularly Fig. 1 and the accompanying text).

Devendra Kumar and Gopal Krishna, "Cosmetic Contact Lenses and Artificial Eyes", Contact Lens Research & Training Centre, Aligarh, India (1981), Plates X and XI and the accompanying legends (particularly Fig. 4 in Plate X and Figs. 1(c) and 2(c) in Plate XI).

Leroy G. Meshel, "Prosthetic Contact Lenses", Chapter 59 (copyright 1984 by Grune & Stratton) in Oliver H. Dabezies, Jr., ed., "Contact Lenses, The CLAO Guide to Basic Science and Clinical Practice", 2, (Little Brown & Co., 2d ed. 1984), particularly Color Plate 59–4B.

Patent Abstracts of Japan, vol. 6, No. 217 (p152) [1095], Oct. 30, 1982, abstract of 57/120,912 cited above.

Montague Ruben, "Color Atlas of Contact Lenses (& Prosthetics)", Photographs 289–291 at p. 78, photographs 571 and 572 at p. 137, and photographs 573 and 574 at p. 138 (1982).

C. P. Söhnges, A New Kind of Contact Lens, text for presentation with slides at the 13th Congress of the International Contact Lens Specialists in Athens, Greece (1967)(slides not included).

C P. Söhnges, "New Designs for Tinted Corneal Lenses" published in "Contacto", vol. 12, No. 1 pp. 56–59 Mar. 1968.

Spectrum Laboratories, advertisements published in *Ophthalmic Optician*, 12(15), 712 (Jul. 22, 1972) and 14(2), 64 (Feb. 2, 1974).

Erwin H. Voss, "La verdad sobre ellente de contacto moderno", Figures 17–12 and 17–13 (1973) and the accompanying text (no translation of figure legends).

Michael S. Wilson & Elisabeth A. W. Millis, "Contact Lenses in Ophthalmology" (Butterworths, 1988), p. v, vii, viii, and 118, particularly Figure 13.13 at p. 118.

Declaration of Herbert Fuhrman in Support of Coopervision's Opposition to Wesley Jessen's Motion for a Preliminary Injunction and attached exhibits, dated May 24, 2001, illustrating "Eye Accents designed by Le Grand—Fuhrman Inc." and "Vanity Colors" contact lenses made and sold by Le Grand—Fuhrman Inc.

Briggs, Charles R., Deposition Transcript, Oct. 27, 1992.

Fuhrman, Herbert, Deposition Transcript, Oct. 30, 1992.

Neefe, Charles, Deposition Transcript, Nov. 3, 1992.

Constance, Spiro, Deposition Transcript, Nov. 3, 1992.

Urbach, Jacqueline, Deposition Transcript, Dec. 8, 1992.

*Ophthalmic Optician*, 12(15) :712, Jul. 22, 1972.

*Ophthalmic Optician*, 14(2) :64, Feb. 2, 1974.

"Neefe Special Contact Lenses," *Contact Lens Forum*, Jun. 1976.

Neefe Optical Laboratory Price Lists, dated Nov. 1974, May 1976, Nov. 1977 and Jan. 1978.

Kumar & Krishna, *Cosmetic Contact Lenses and Artificial Eyes*, Contact Lens Research & Training Institute, Delhi University Press, 1981.

Hofer, "Soft Contact Lenses With Artificial Irises" NOJ Nov. 1981 pp. 82–87 (with English Translation).

Contacto, vol. 12, No. 1 pp. 56–59 (Mar. 1968).

Davies, "The Effect of Tinted Hydrogel Lenses on Iris Color" Optician, Oct. 6, 1989, pp. 21–24.

Contact Lenses, section 59 "Prosthetic Contact Lenses"; Pp. 59.1 to 59.9 with color photographs (1984).

Contact Lens Practice by Robert B. Mandell, O.D. Ph.D., Chapter 26, Specialized Lens Types (1965, 1974, 1981, 1988).

Contact Lens Fitting, A Clinical Text Atlas by Frank J. Weinstock, Chapter 8,Tinted Soft Lenses: The Full Spectrum (1989).

* cited by examiner

COLORED CONTACT LENS HAVING VERY NATURAL APPEARANCE

This is a Continuation of U.S. application Ser. No. 07/984,817, filed Dec. 3, 1992, now U.S. Pat. No. 5,414,477, which in turn is a Continuation of U.S. application Ser. No. 07/704,260, filed May 22, 1991, now abandoned, which in turn is a Continuation of U.S. application Ser. No. 07/430,222 filed Nov. 1, 1989, now abandoned.

The present invention relates to colored contact lenses and in particular to such lenses having opaque colored portions that are able to change the apparent color of the wearer's iris while imparting a very natural appearance.

It was recognized very early that a contact lens with opaque coloring should not have a simple solidly colored iris. Such a lens imparts a very unnatural appearance. Wichterle in U.S. Pat. No. 3,679,504 discloses an opaque lens having an iris of more than a single color that is artistically drawn or photographically reproduced. Such a lens never achieved commercial success. Other attempts to produce an opaque lens with a natural appearance are disclosed in. U.S. Pat. Nos. 3,536,386, (Spivak); 3,712,718 (LeGrand), 4,460,523 (Neefe), 4,719,657 (Bawa), 4,744,647 (Meshel et al.), 4,634,449 (Jenkins); European Patent Publication No. 0 309 154 (Allergan) and U.K. Patent Application No. 2 202 540 A (IGEL).

Knapp (in U.S. Pat. No. 4,582,402) discloses a contact lens having, in its preferred embodiment, colored, opaque dots. The Knapp lens has been an enormous commercial success. A natural appearance is achieved, yet the lens is simple and inexpensive to produce, using a simple one-color printed dot pattern. At Column 3, lines 23 to 29, Knapp discloses that "For a more natural effect, the printing step may be repeated one or more times using different patterns in different colors, since upon close examination the iris's of many persons are found to contain more than one color. The printed pattern need not be absolutely uniform, allowing for enhancement of the fine structure of the iris." The one-color Knapp lenses currently achieving commercial success have their dots arranged in an irregular pattern to enhance the structure of the iris. However, neither the Knapp commercial lenses, nor the Knapp patent disclose or suggest how one would arrange a pattern of dots having more than one color to achieve a more natural appearance.

The present invention is predicated on the surprising discovery that very simple multiple-color opaque patterns (some of them in accordance with the Knapp disclosure) achieve an amazingly naturally appearing iris. The improvement in appearance over the one-color Knapp lenses, currently achieving enormous commercial success, is startling. Like the one color lenses, the lenses of this invention are able to cause a fundamental change in the apparent color of the wearer's iris, e.g. from dark brown to light blue or green. Although the preferred embodiments of the invention are two-color lenses, use of more than two colors is contemplated.

SUMMARY OF THE INVENTION

One aspect of the invention comprises a colored contact lens comprising a non-opaque pupil section, an iris section surrounding said pupil section, and a colored, opaque intermittent pattern over said entire iris section, that leaves a substantial portion within the interstices of the pattern non-opaque, said pattern covering at least about 25 percent of the area of said iris section, the elements of said pattern being undiscernible to the ordinary viewer, wherein a first portion of the elements of said pattern are of a first shade and a second portion of the elements of said pattern are of a second shade different from said first shade, wherein said first portion is located generally on the outside of said iris section and said second portion is located generally on the inside of said iris section, and a jagged border separates said first and second portions, wherein the minimum distance of said jagged border from the outer perimeter of said iris section is from about 5% to about 45% of the radial width of said iris section, and the maximum distance of said border from the outer perimeter of said iris section is from about 45% to about 95% of the radial width of said iris section, thereby providing a lens capable of changing the apparent color of the iris of a person wearing the lens and imparting a very natural appearance.

A second aspect of the invention comprises a colored contact lens comprising a non-opaque pupil section, an opaque iris section surrounding said pupil section except for non-opaque elements in said iris section undiscernible to the ordinary viewer, wherein a first portion of said opaque iris section is of a first shade, and a second portion of said opaque iris section is of a second shade different from said first shade, said first portion is located generally on the outside of said iris section and said second portion is located generally on the inside of said iris section, and a jagged border separates said first and second portions, wherein the minimum distance of said jagged border from the outer perimeter of said iris section is from about 5% to about 45% of the radial width of said iris section, and the maximum distance of said border from the outer perimeter of said iris section is from about 45% to about 95% of the radial width of said iris section, thereby providing a lens capable of changing the apparent color of the iris of a person wearing the lens and imparting a natural appearance.

A third aspect of the invention comprises a colored contact lens comprising a non-opaque pupil section and an .opaque iris section surrounding said pupil section, wherein a first portion of said iris section is of a first shade, and a second portion of said iris section is of a second shade different from said first shade, said first portion is located generally on the outside of said iris section and said second portion is located generally on the inside of said iris section and a jagged border separates said first and second portions, wherein the minimum distance of said jagged border from the outer perimeter of said iris section is from about 5% to about 45% of the radial width of said iris section, and the maximum distance of said border from the outer perimeter of said iris section is from about 45% to about 95% of the radial width of said iris section, thereby providing a lens capable of changing the apparent color of the iris of a person wearing the lens and imparting a natural appearance.

A fourth aspect of the invention comprises a colored contact lens comprising a non-opaque pupil section and an iris section surrounding said pupil section, said iris section comprising a first outer portion and a second inner portion separated by a jagged border wherein the minimum distance of said jagged border from the outer perimeter of said iris section is from about 5% to about 45% of the radial width of said iris section and the maximum distance of said border from the outer perimeter of said iris section is from about 45% to about 95% of the radial width of said iris section, wherein one of said sections is non-opaque and the other section has opaque coloring.

A fifth aspect of the invention comprises a colored contact lens comprising a non-opaque pupil section and an iris section surrounding said pupil section, said iris section comprising a first outer portion surrounding a second intermediate portion and a third inner portion surrounded by said intermediate portion, said first and second portions separated by a first jagged border and said second and third portions separated by a second jagged border, wherein either said first and third portions have opaque coloring and said second portion is non-opaque, or said second portion has opaque coloring and said first and third portions are non-opaque, or said first, second and third portions have opaque coloring and said second portion has a different shade then said first and second portions.

Preferably, in the first aspect of this invention, the elements of the pattern are opaque dots, and the following color combinations are used:

| FIRST (OUTER) PORTION | SECOND (INNER) PORTION |
|---|---|
| Green | Hazel |
| Blue | Hazel |
| Brown | Hazel |
| Blue | Gray |

The most preferable dot patterns are as shown in FIGS. 1 to 6.

The term "non-opaque" as used herein is intended to describe a part of the lens that is uncolored or colored with translucent coloring.

The term "second shade different from said first shade" as used herein is intended to mean that both shades are of totally different colors, such as blue and hazel; or that both shades are the same basic color, but having different intensities such as light blue and dark blue.

The term "ordinary viewer" is intended to mean a person having normal 20-20 vision standing about 5 feet from a person wearing the lenses of this invention.

As shown below, this pattern may be overprinted to form a lens in accordance with the present invention.

Figure 2:
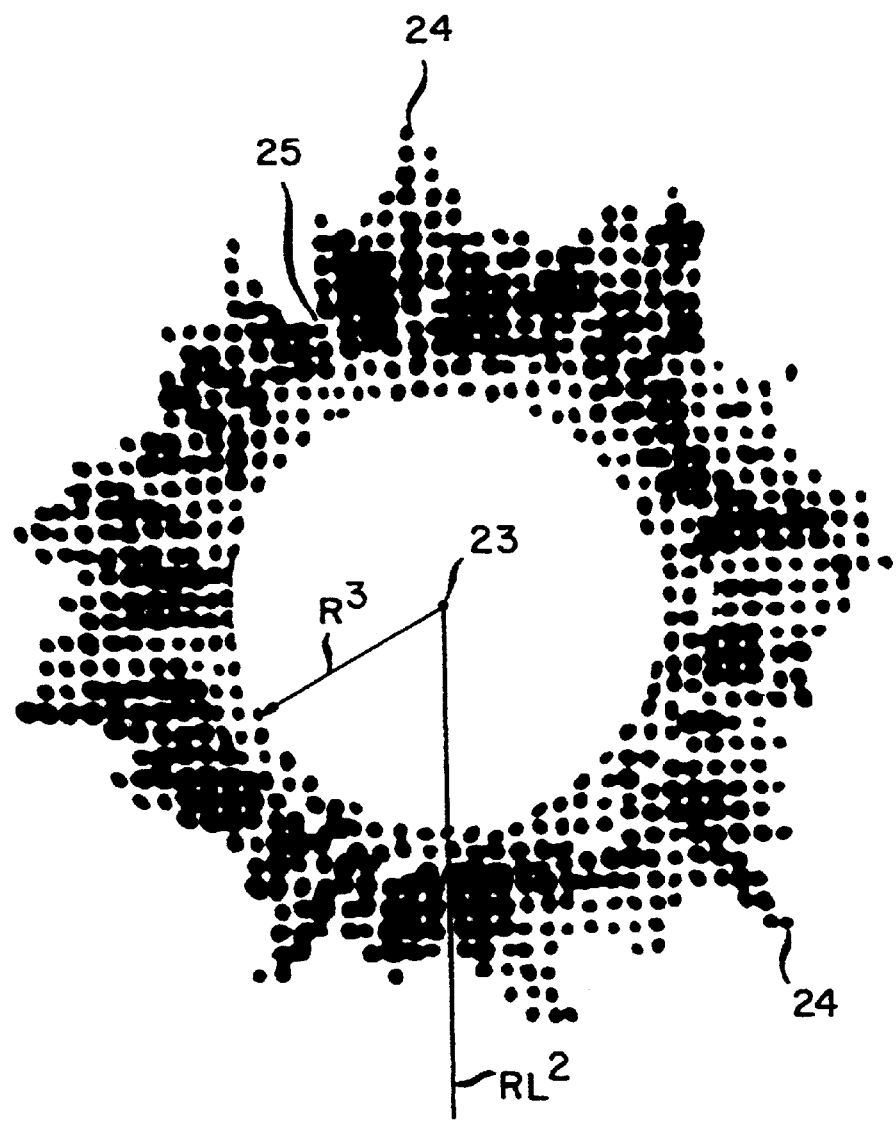

FIG. 2 illustrates a preferred dot pattern of an inside portion of dots in accordance with the invention.

Figure 3:
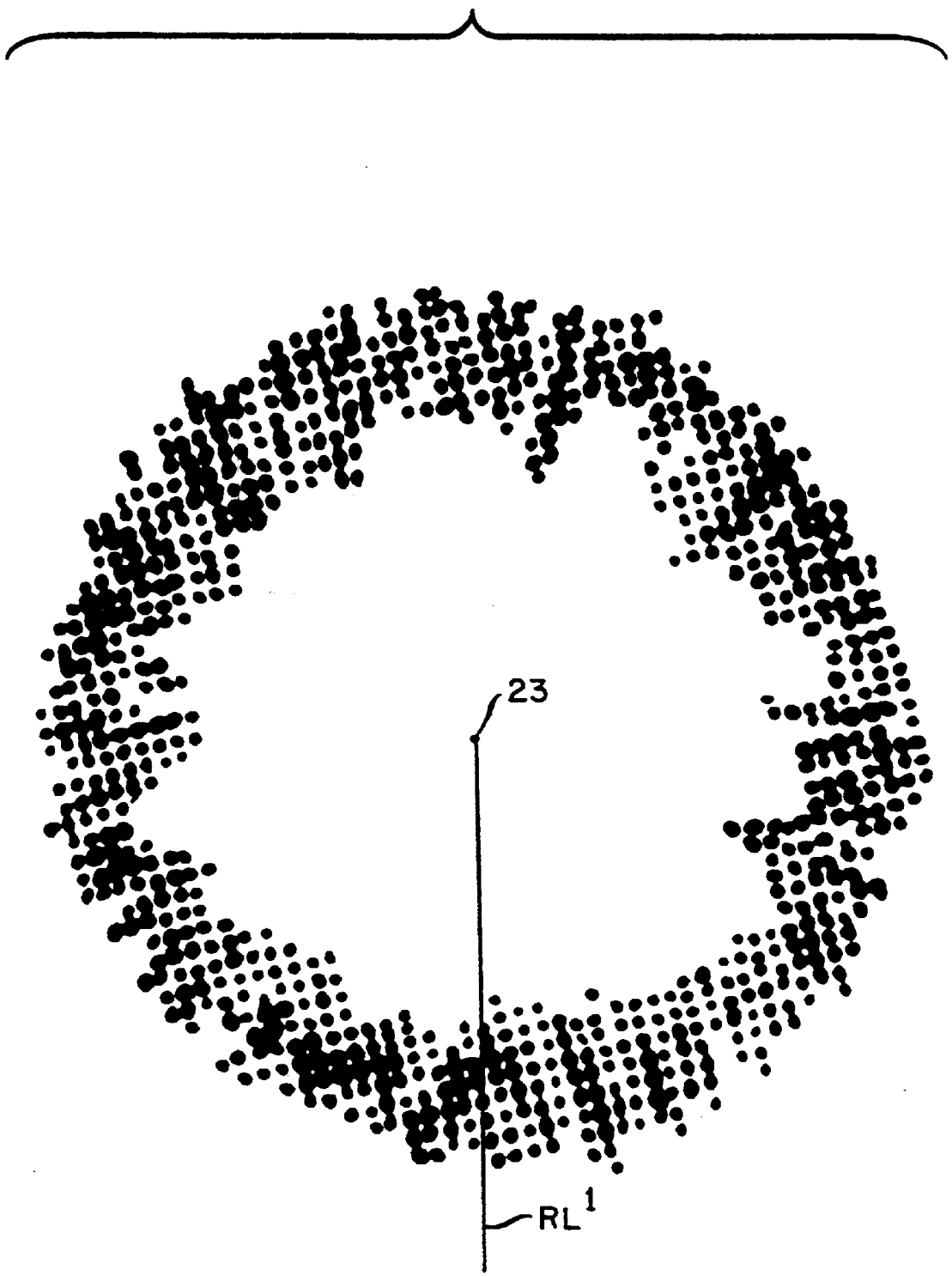

FIG. 3 illustrates a preferred dot pattern of an outside portion of dots in accordance with the invention.

Figure 4:
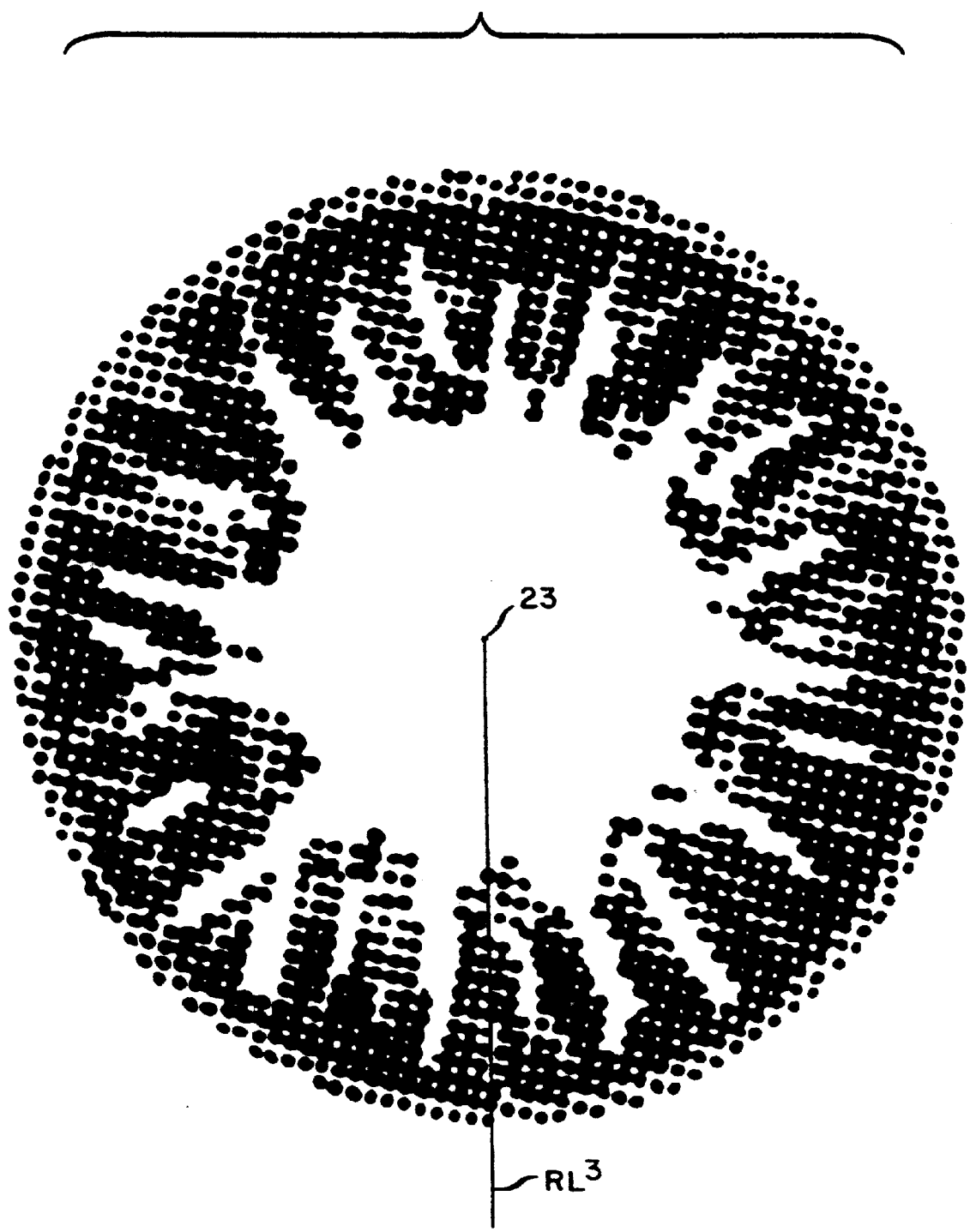

FIG. 4 illustrates a alternative dot pattern for an outside portion of dots in accordance with the invention.

Figure 5:
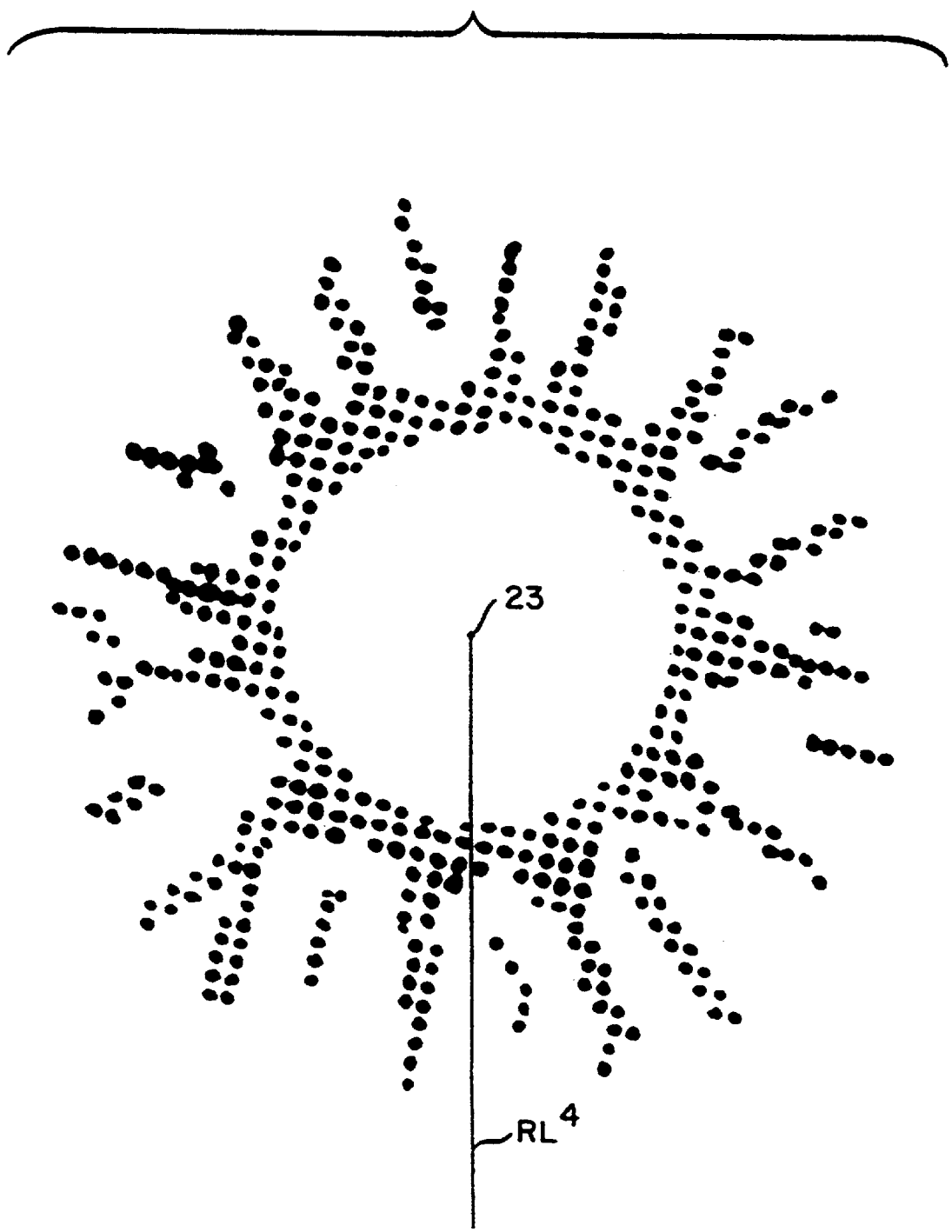

FIG. 5 illustrates an alternative dot pattern for an inside portion of dots in accordance with the invention.

Figure 6:
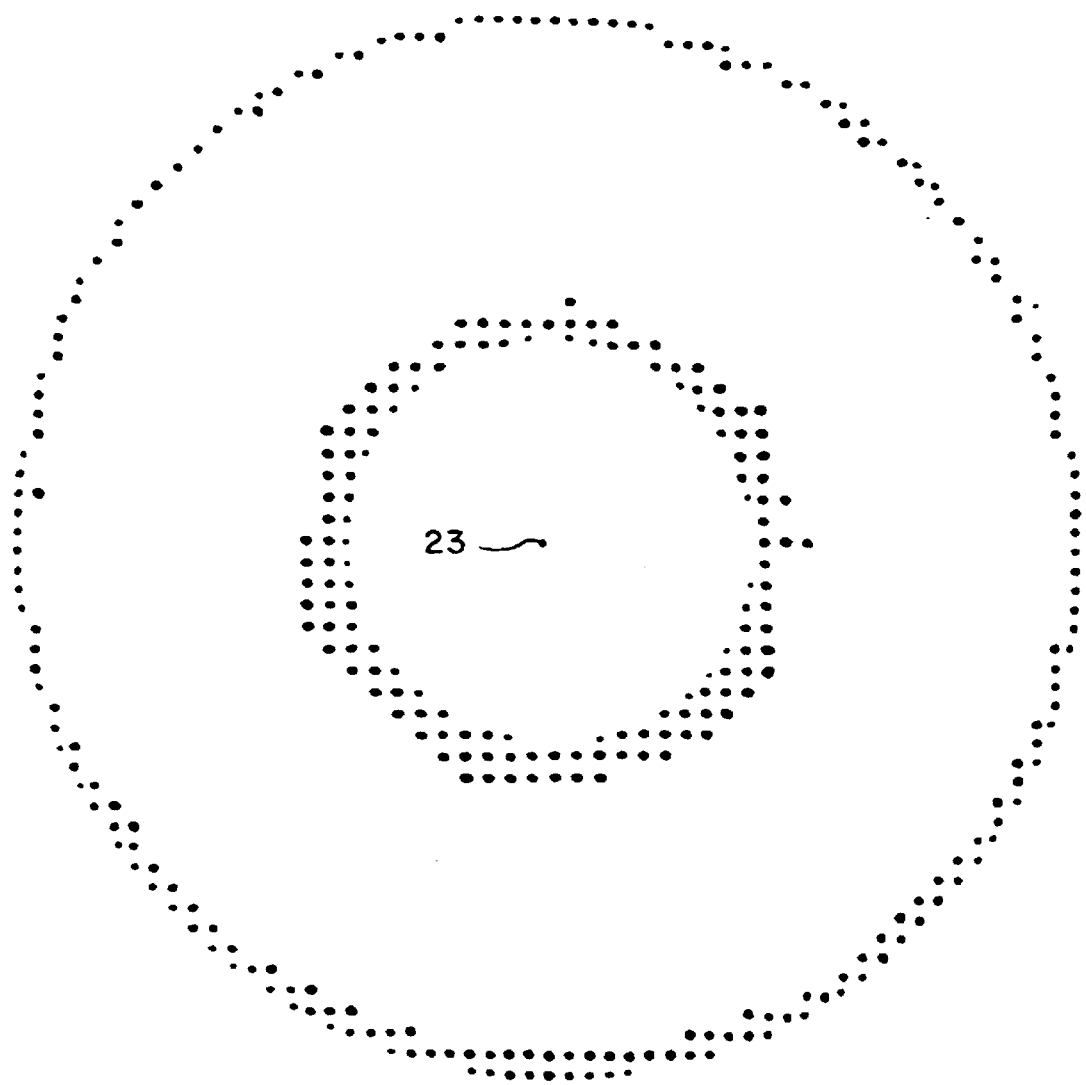

FIG. 6 illustrates a dot pattern for overprinting lenses in accordance with the invention with a third color.

Figure 7:
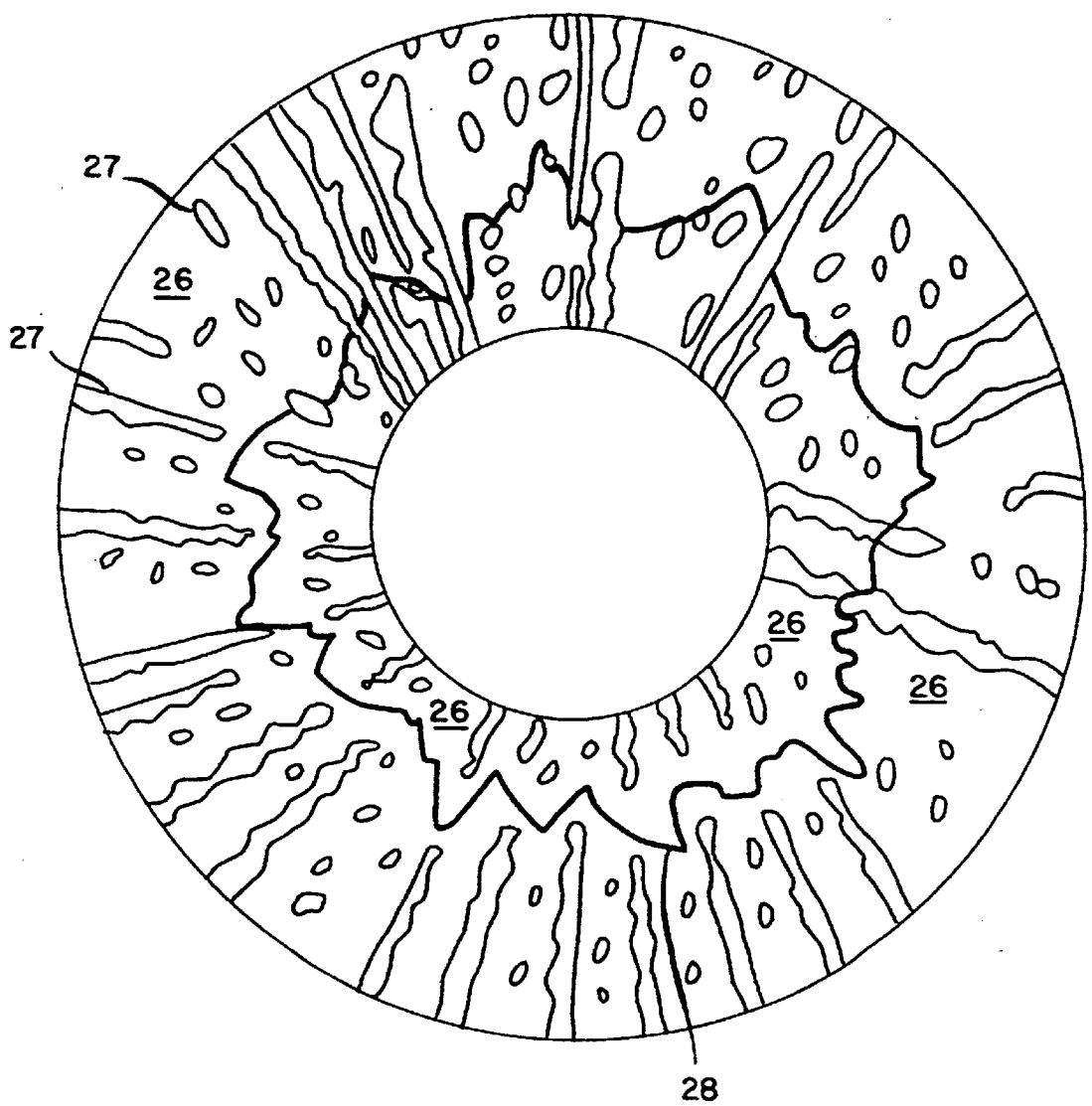
Figure 8:
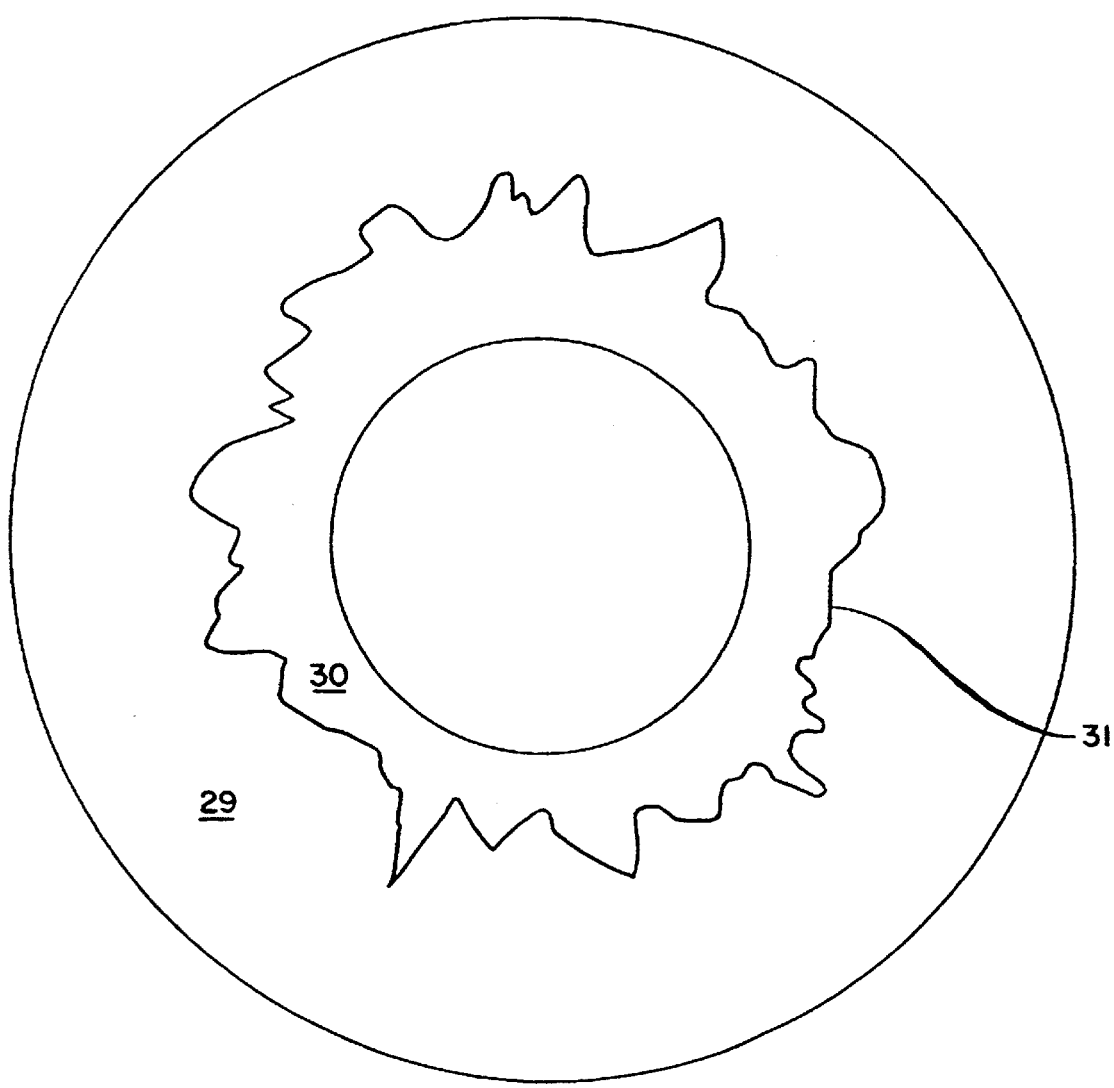

FIGS. 7 and 8 illustrate alternative embodiments of iris patterns in accordance with the second and third aspects of the invention, respectively.

Figure 9:
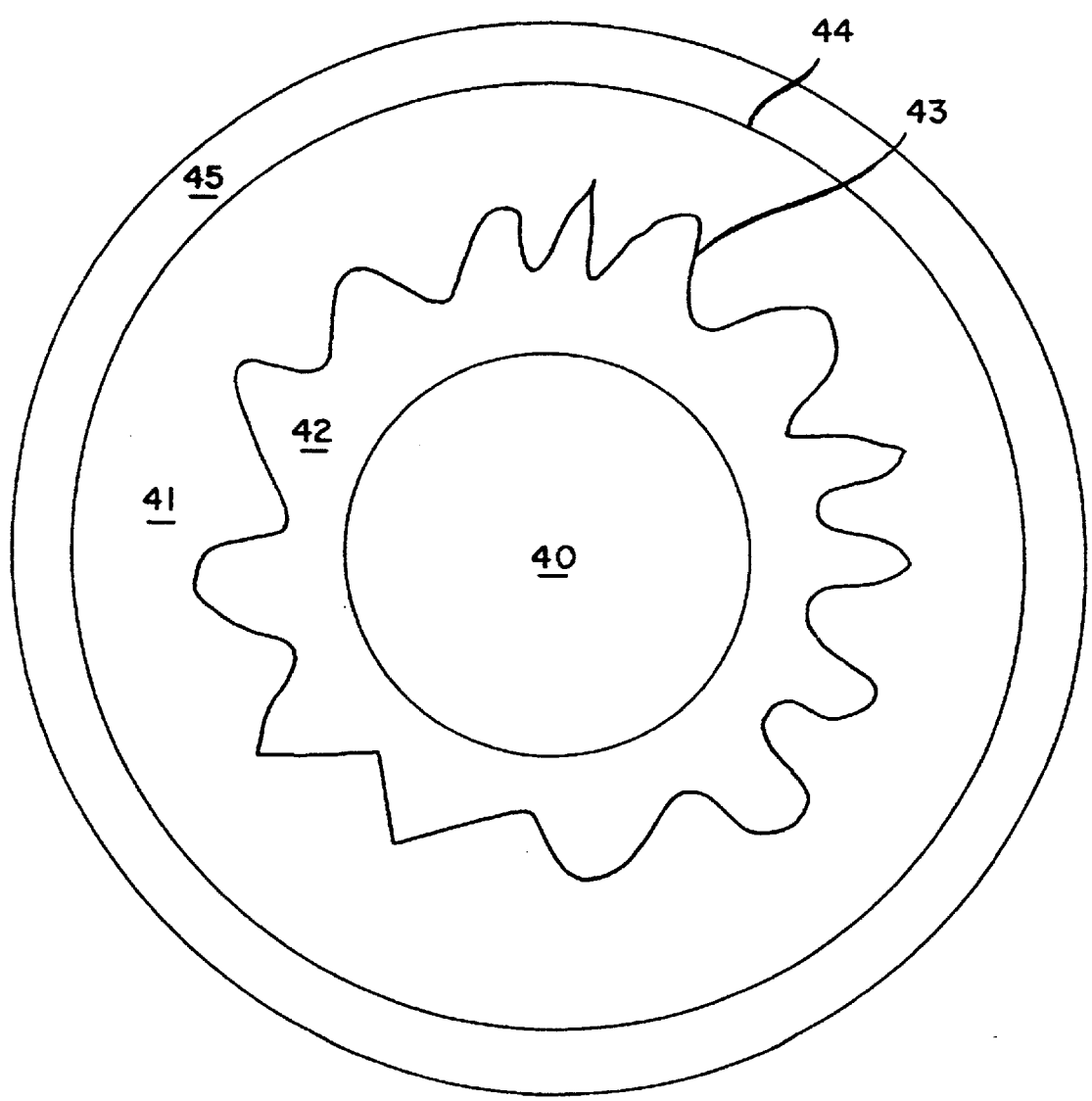
Figure 10:
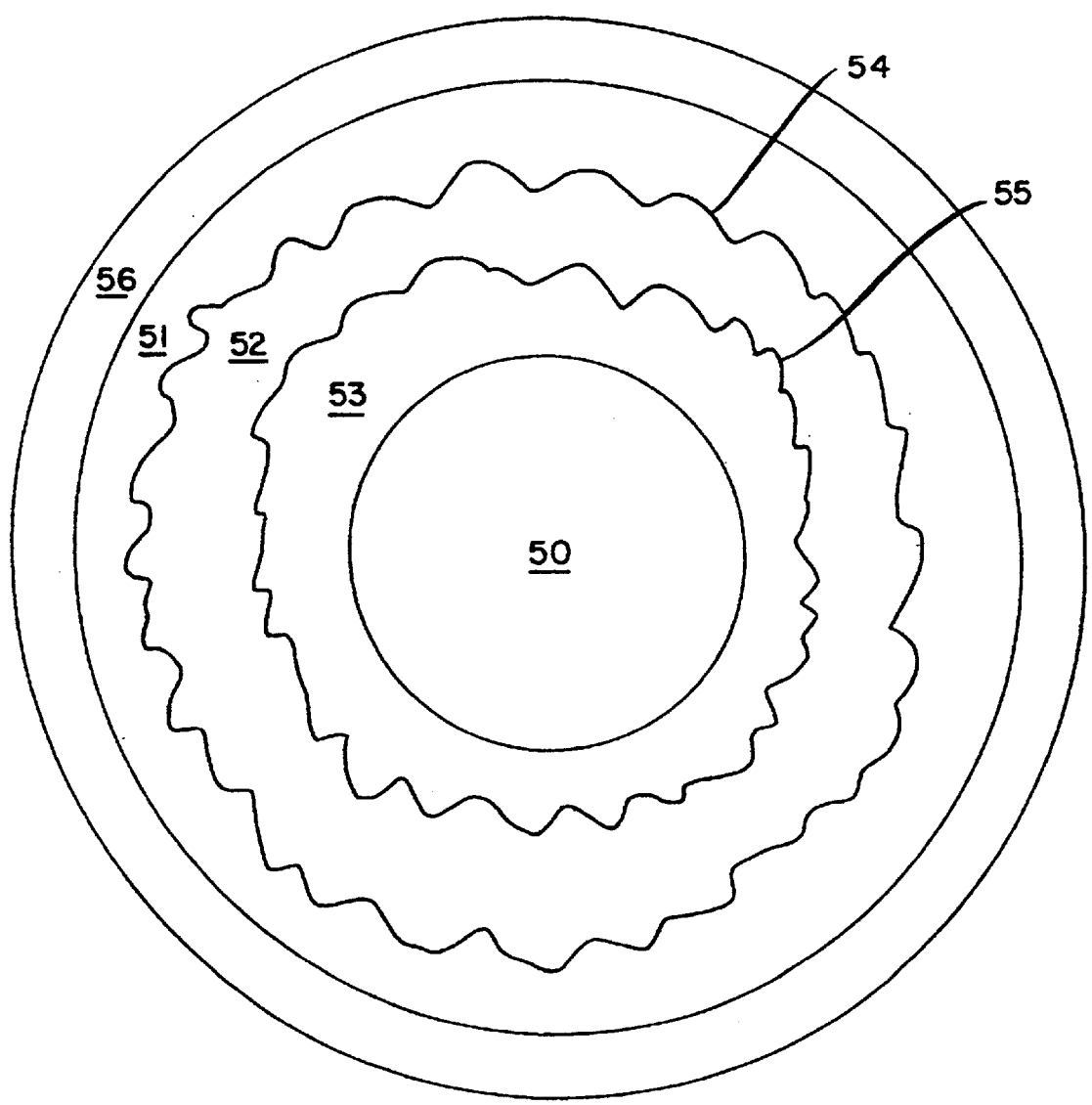

FIGS. 9 and 10 illustrate further alternative embodiments of iris patterns in accordance with the fourth and fifth aspects of the invention, respectively.

DETAILED DESCRIPTION OF THE INVENTION

Figure 1:
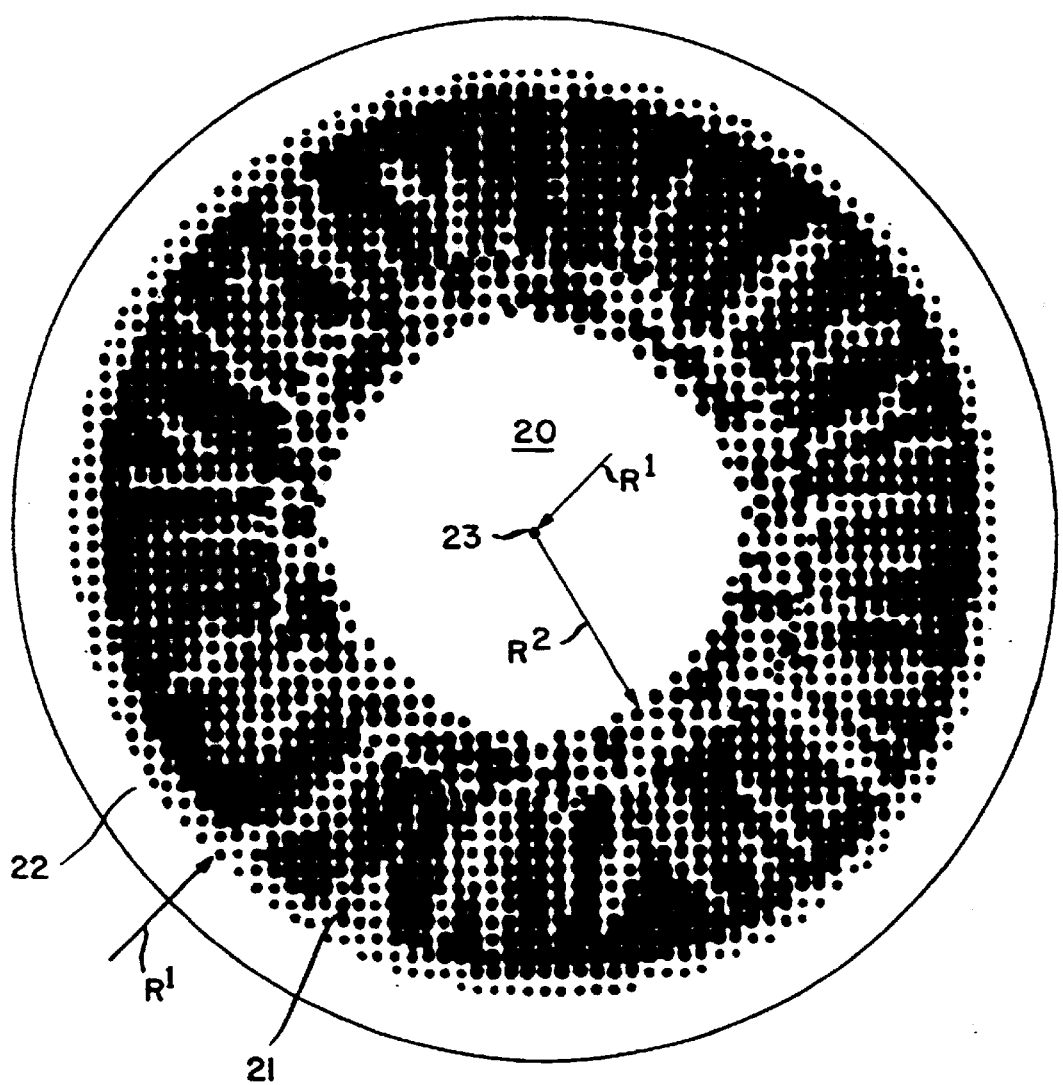
FIG. 1 illustrates a dot pattern very close to the one-color dot pattern of the Knapp lenses currently being sold.

Contact lenses in accordance with the preferred embodiments of this invention are also in accordance with those disclosed in Knapp's U.S. Pat. No. 4,582,402. Such a prior art lens is illustrated in FIG. 1. It has a non-opaque pupil section 20 in the center of lens, and an annular iris section 21 surrounding the pupil section. For hydrophilic lenses peripheral section 22 surrounds iris section 21. A colored, opaque, intermittent pattern is located over the entire iris section 21, as show in FIG. 1. The pattern leaves a substantial portion of the iris section within the interstices of the pattern non-opaque. The non-opaque areas of iris section 21 appear white in FIG. 1.

The elements of the pattern are preferably dots, and especially preferred are dots, some of which run together, as shown in FIG. 1. Certain portions of the iris section 21 are less densely covered with dots than other portions. The less densely covered portions form approximately radial spokes. This arrangement enhances the structure of the iris of a person wearing the lens.

Of course, the opaque pattern may be comprised of dots having any shape, regular or irregular, such as round, square, hexagonal, elongated, etc. Furthermore, the elements of the pattern may have a shape other than dots, so long as the elements are undescrinable to the ordinary viewer, cover at least about 25 percent of the iris, and leave a substantial portion of the iris section within the interstices of the pattern non-opaque.

Thus far, this description has covered the Knapp invention of U.S. Pat. No. 4,582,402 and lenses in accordance thereof which have been sold commercially since about November, 1986. The one-color commercial lenses have a pattern that is almost exactly like that of FIG. 1, except that the commercial lenses have a smaller pupil section and a wider iris section caused by about two extra rows of dots on the periphery of pupil section 20. That is, the two extra rows of dots, actually present in the commercial lenses, are not shown in FIG. 1.

The improvement of this invention is a very simple multiple-color pattern that greatly improves the natural appearance of the wearer's iris, even over that of the one-color lens currently achieving much commercial success. To produce this two-color pattern of this invention, the elements of the pattern (preferably dots) are in two portions. A first portion of the elements are of a first shade and are located generally on the outside of the iris section, i.e. at or near the outer perimeter of the annular iris section. A preferable first outside portion pattern is shown in FIG. 3. A second portion of the elements are of a second shade different from the first shade and are located generally on the inside of the iris section, i.e. at or near the inner perimeter of the annular iris section and surrounded by the first outside portion. A preferable second inside portion pattern appears in FIG. 2. A jagged border separates the inner and outer portions of the pattern elements. This border need not be precise. Some dots of the first shade may be mixed in with dots of the second shade, so long as there is a jagged border or border zone across which there takes place a noticable change of shade. If the patterns of FIGS. 2 and 3 are merged to form a two-color lens, the jagged outer edge of the pattern of FIG. 2 will merge with the jagged inner edge of the pattern of FIG. 3 to form the required jagged border between the two portions having different shades.

Producing the opaque portions of the iris section is preferably accomplished by printing the lens twice using the known printing process of Knapp's U.S. Pat. No. 4,582,402, incorporated herein by reference. Very briefly, a plate or cliche having depressions in the desired pattern is smeared with ink of the desired shade. Excess ink is removed by scrapping the surface of the plate with a doctor blade leaving the depression filled with ink. A silicon rubber pad is pressed against the plate to pick up the ink from the depressions and then is pressed against a surface of the lens to transfer the pattern to the lens. The printed pattern is then cured to render it unremovable from the lens. Of course, either the anterior or posterior surfaces of the lens may be printed, but printing the anterior surface is presently preferred.

The preferred lenses and inks used to practice this invention are known and described in Loshaek's U.S. Pat. No. 4,668,240, incorporated herein by reference. Very briefly, a lens constructed of polymer having —COOH, —OH, or —NH$_2$ groups is printed with ink containing binding polymer having the same functional groups, opaque coloring substance, and a diisocyanate compound. First a solution of binding polymer and solvent is prepared and this solution is mixed with paste containing the coloring substance to form an ink. The preferred binding polymer solutions described in the Loshaek patent have a viscosity of 25,000 CPS. It is currently preferred to form inks for the present lenses from binding polymer solutions having a viscosity of about 40,000 CPS. The opaque ink is printed and cured on the lens surface.

Of course, alternative ways to form colored opaque elements of the lens may be used. For example, selected portions of the iris section of a wetted hydrophilic lens may be impregrenated with a solution of a first substance, such as barium chloride. Then the lens may be immersed in a solution of a second substance, such as sulfuric acid, that forms an opaque, water-insoluble precipitate with the first substance, for example barium sulfate. Thus an opaque precipitate forms within the lens in a predetermined pattern in the iris section. Next all or at least the opaque pattern of the iris section is colored with translucent tint in two colors in accordance with this invention. This provides a lens having a colored opaque pattern in accordance with the invention. If the entire iris is colored with translucent tint, then the interstices within the pattern will be translucently colored, but still non-opaque and in accordance with the first or second aspects of the present invention. Optionally, the pupil section of the lens may be colored by a non-opaque tint, because such tint is not visible when the lens is against the dark pupil present in the eye of the wearer. Other alternative opaquing methods include use of a laser (U.S. Pat. No. 4,744,647) and finely ground particles U.S. Pat. No. 4,460,523.

The following examples illustrate preferred embodiments, but in general, the exact opaque pattern, and the methods of achieving opacity and coloring are not critical to practice of the invention.

In the following examples, all dimensions are for unhydrated hydrophilic lenses. Upon hydration, the lenses expand by a factor of about 1.3 times their unhydrated size. Hence, upon hydration, all dimensions will be about 1.3 times the values that follow. However, the calculated distances of the jagged border from the outer perimeter of the iris section as a percent of the radial width of the iris section will not change upon hydration.

Although preferred lenses of this invention expand by a factor of about 1.3 upon hydration, those skilled in the art will recognize that different lenses having different amounts of expansion upon hydration may also be used.

EXAMPLE 1

A hydrophilic lens made of hydroxyethyl methacrylate, ethoxy ethyl methacrylate, and methacrylic acid as shown in U.S. Pat. No. 4,668,240 is printed on its front, convex side with ink of a first shade containing pigment, binding polymer made from the same monomers used to form the lens, hexamethylene diisocyanate and solvent. The printed pattern is shown in FIG. 1. It covers most of the iris section, having an annular form, with an outer radius $R^1$ of about 5.2 mm and an inner radius $R^2$ of about 2.2 mm. After the ink has cured, the first pattern is overprinted with the pattern shown in FIG. 2 having a different shade than the pattern of FIG. 1. To accomplish this second printing, it is highly preferable to have the centers 23 of the patterns overlap. However, it is not necessary to rotationally align the patterns of FIGS. 1 and 2. That is, after the FIG. 1 pattern is printed on the lens, the rotation of the lens or the pad used in printing the pattern of FIG. 2 about lens center 23 is not important. An attractive lens is produced regardless of this rotation.

The lens pattern of FIG. 2 has an inner radius $R^3$ of about 2 mm and a variable outer radius having a maximum of about 4.5 mm at 24 and a minimum of about 2.7 mm at 25. Variations in the outer radius create the jagged outer edge of the FIG. 2 pattern. Notice that since the FIG. 1 pattern has a has radius $R^1$ of 5.2 mm, the outer pattern extends inward, into the iris section distances of about 5.2–4.5 or 0.7 mm (minimum) to about 5.2–2.7 or 2.5 mm (maximum).

The radial width of the iris section is outer radius $R^1$ minus inner radius $R^3$ or 5.2 mm –2 mm =3.2 mm. Hence, it can be seen that the distance of the jagged border from the outer perimeter of the iris section ranges from a minimum of 0.7/3.2 or about 20% of the radial width of the iris section to a maximum of 2.5/3.2 or about 80% of the radial width of the iris section. In general, the minimum distance of the jagged border from the outer perimeter of the iris section should be from about 5% to about 45% (more preferably about 10% to about 30%) of the radial width of the iris section and the maximum distance of the jagged border from the outer perimeter should be from about 45% to about 95% (more preferably about 60% to about 80%) of the radial width. Hence, the outer pattern comprises a substantial portion of the area of the iris and is not merely a thin outer ring at the periphery as described, for example, in U.S. Pat. No. 4,719,657, (Bawa) col. 7, line 56 to Col. 8, line 34. The finished lens of this example will have the FIG. 1 pattern overprinted by the FIG. 2 pattern and will thus have an outer portion comprised solely of elements of the first shade of FIG. 1 and an inner portion comprised primarily of the second shade of FIG. 2, but with some of the FIG. 1 shade showing through the interstices of the FIG. 2 pattern.

Although the exact shades used in practicing the invention are not critical, the shades produced by the Inks shown in the table below are presently preferred.

PIGMENT WT % IN INK

| INK NO. | NOMINAL COLOR | $TiO_2$ | FeO (Red) | FeO (Blk) | FeO (Yel) | $Cr_2O_3$ | PCN BLUE |
|---|---|---|---|---|---|---|---|
| 1 | Blue | 5.3 | 0 | 0 | 0 | 0 | 0.6 |
| 2 | Hazel | 0.7 | 1.9 | 0 | 5.3 | 0 | 0.1 |
| 3 | Green | 0.0 | 0 | 0 | 0 | 12.2 | 0 |
| 4 | Brown | 0.0 | 5.3 | 8.7 | 0 | 8.8 | 0 |
| 5 | Yellow Brown | 0.3 | 0.8 | 0 | 4.6 | 0 | 0 |
| 6 | Misty Gray | 4.2 | 0 | 1.1 | 0 | 0 | 0 |
| 7 | Dark Gray | 4.3 | 0 | 7.1 | 0 | 0 | 0 |
| 8 | Black | 0.0 | 0 | 14.6 | 0 | 0 | 0 |

In the above table, the following abbreviations are used:
$TiO_2$ Titanium Dioxide
FeO (Red) Red Iron Oxide
FeO (Blk) Black Iron Oxide
FeO (Yel) Yellow Iron Oxide
$Cr_2O_3$ Chromium Sesquioxide
PCN Blue Phthalocyanine blue (Pigment Blue 15, C.I.74160)

In addition to the pigments, the inks contain binder polymer, solvent, and di- or higher isocyanate compound as described in Loshaek's U.S. Pat. No. 4,668,240. The following specific color combinations are currently preferred:

| EXAMPLE | FIG. 1 PATTERN | FIG. 2 PATTERN |
|---|---|---|
| 1A | Ink No. 3 (Green) | Ink No. 2 (Hazel) |
| 1B | Ink No. 1 (Blue) | Ink No. 2 (Hazel) |
| 1C | Ink No. 4 (Brown) | Ink No. 5 (Yellow Brown) |
| 1D | Ink No. 1 (Blue) | Ink No. 6 (Gray) |

EXAMPLE 2

A contact lens is printed first with the pattern of FIG. 3 and then with the pattern of FIG. 2 in a second shade. When using these two patterns, centers 23 of both patterns are in alignment and in addition the patterns are rotationally aligned so that radial lines $RL^1$ and $RL^2$ coincide. The following color combinations are currently preferred:

| EXAMPLE | FIG. 3 PATTERN | FIG. 2 PATTERN |
|---|---|---|
| 2A | Ink No. 1 (Blue) | Ink No. 2 (Hazel) |
| 2B | Ink No. 3 (Green) | Ink No. 2 (Hazel) |
| 2C | Ink No. 4 (Brown) | Ink No. 5 (Yellow Brown) |
| 2D | Ink No. 1 (Blue) | Ink No. 6 (Misty Gray) |
| 2E | Ink No. 6 (Misty Gray) | Ink No. 7 (Dark Gray) |

EXAMPLE 3

Contact lenses are printed with the pattern of FIG. 4, then with the pattern of FIG. 5 in a second shade, and finally with the pattern of FIG. 6 in a third shade. Centers 23 of each pattern are aligned and patterns 4 and 5 are rotationally aligned along radial lines $RL^3$ and $RL^4$. As seen in FIGS. 4 and 5, the jagged border between the portions of the iris sections having the first and second shades will be a minimum distance of about 10% of the radial width of the iris section from the outer perimeter of the iris section and a maximum distance of about 80% of the radial width. This border is very jagged and less distinct than the border of examples 1 and 2. The following color combinations are currently preferred:

| EXAMPLE | FIG. 4 PATTERN | FIG. 5 PATTERN | FIG. 6 PATTERN |
|---|---|---|---|
| 3A | Ink No. 3 (Green) | Ink No. 2 (Hazel) | Ink No. 8 (Black) |
| 3B | Ink No. 1 (Blue) | Ink No. 2 (Hazel) | Ink No. 8 (Black) |
| 3C | Ink No. 5 (Brown) | Ink No. 5 (Yellow Brown) | Ink No. 8 (Black) |
| 3D | Ink No. 1 (Blue) | Ink No. 6 (Gray) | Ink No. 8 (Black) |
| 3E | Ink No. 6 (Misty Gray) | Ink No. 7 (Dark Gray) | Ink No. 8 (Black) |

Example 3A to 3E illustrate three-color lenses.

All of the lenses in accordance with the above examples have a much more natural appearance than the one-color lenses in accordance with Knapp's U.S. Pat. No. , 4,582,402, currently achieving enormous commercial success.

EXAMPLE 4

Prepare a lens in accordance with the second aspect of this invention by using the patterns of FIG. 7. In FIG. 7, an opaque iris section 26 has non-opaque elements 27 (only a few of which are labeled). The non-opaque elements of FIG. 7 are roughly radially elongated areas and dots. The opaque area has a first section of a first shade and a second inner section of a second shade different from the first shade, separated by jagged border 28.

EXAMPLE 5

Prepare a lens in accordance with the third aspect of the invention by using the patterns of FIG. 8. The iris section of the lens is opaque. An outer section 29 has a first shade and an inner section 30 has a second shade. Jagged border 31 separates sections 29 and 30.

Although lenses in accordance with Examples 4 and have not been produced, it is believed that they would achieve a far more natural appearance than the same lenses having a single color. Yet preparing lenses in accordance with these two embodiments is much more simple and much less expensive than attempting to reproduce a natural iris by photographic or artistic means as disclosed by Wichterle in U.S. Pat. No. 3,679,504.

FIG. 9 illustrates a lens in accordance with the fourth aspect of the invention wherein a substantial portion of the natural color of the wearer's iris may be visible. The lens of FIG. 9 comprises a non-opaque pupil section 40 and an iris section comprising a first outer portion 41 and a second inner portion 42. Iris portions 41 and 42 are separated by jagged border 43 having the same minimum and maximum distances from the outer perimeter 44 of the iris section as percentages of the radial width of the iris section as described previously. One of portions 41 or 42 is non-opaque and the other portion has opaque coloring. For example, inner portion 42 may have opaque coloring and outer portion 41 may be non-opaque, or vice versa. If the non-opaque portion is uncolored, or if the non-opaque portion is translucently colored and the wearer has iris's having dark-enough color to show through the non-opaque coloring, than a substantial portion of the natural color of the wearer's iris will be visible. For hydrophilic lenses, a non-opaque outer section 45 surrounds the iris section. Preferably, the opaque coloring is a pattern of elements not discernable to the ordinary viewer, but solid opaque color coloring or solid coloring with non-opaque elements could also be used.

FIG. 10 illustrates a lens accordance with the fifth aspect of the invention. This lens, like that of the lens of FIG. 9, also may allow a substantial portion of the natural color of the wearer's iris to be visible. The lens of FIG. 10 comprises a pupil section 50 and an iris section comprising a first outer portion 51 surrounding a second intermediate portion 52, and a third inner portion 53 surrounded by intermediate portion 52. Outer portion 51 and intermediate portion 52 are separated by a first jagged border 54. Intermediate portion 52 and inner portion 53 are separated by a second jagged border 55. For hydrophilic lenses, a non-opaque outer section 56 surrounds the iris section. In this embodiment of the invention, three different color schemes are contemplated.

A. Inner portion 53 and outer portion 51 have opaque coloring and intermediate portion 52 is non-opaque, or B. Intermediate portion 52 has opaque coloring and inner portion 53 and outer portion 51 are non-opaque, or C. All three portions 51, 52 and 53 have opaque coloring and intermediate portion 52 has a different shade than outer portion 51 and inner portion 53.

Preferably the opaque coloring is a pattern of elements undiscernable to the ordinary viewer, but, of course, other types of opaque coloring may be used.

When the lenses of FIGS. 9 and 10 having a non-opaque section allow the wearer's natural iris color to be visible, identically colored lenses could cause very different appearances in different wearers, allowing very pleasing and varied color effects.

The above examples and the drawings are intended to illustrate, but not limit the present invention, which is as defined in the claims. Numerous variations from the examples and drawings but still in accordance with the invention are possible. For example, the colors and pattern arrangements may be varied. Either the anterior or posterior surface of the lens or both may be printed. The opaque material may be on the lens surface or within the lens, or both. Furthermore, in lenses intended for wearers having lightly colored iris's, the opaque coloring may be merely translucent.

What is claimed is:

1. A hydrophilic colored contact lens comprising:
a non-opaque pupil section, a generally annular iris section surrounding the pupil section, and a non-opaque peripheral section surrounding the iris section, the iris section having a colored, printed, opaque, intermittent pattern of elements covering at least about 25 percent of the area of the iris section, the pattern leaving a portion of the iris section non-opaque within interstices of the patter, the non-opaque portion of the iris section including generally radially elongated areas, the intermittent pattern extending across the entire area of the iris section, the iris section having an outer perimeter and an inner perimeter, and including pattern elements of a first shade, pattern elements of a second shade located generally at or near the inner perimeter of the iris section, and a jagged border zone generally along an interface of the pattern elements of the first and second shades, the iris section also including pattern elements of a third shade, wherein some of the pattern elements of the first shade are mixed with the pattern elements of the second shade, and a noticeable change of shade occurs across the jagged border zone, wherein the minimum distance of the jagged border zone from the outer perimeter is from about 5% to about 45% of the radial width of the iris section, and the maximum distance of the jagged border zone from the outer perimeter is from about 45% to about 95% of the radial width of the iris section, wherein the elements of the pattern are indiscernible to the ordinary viewer, and wherein the lens is capable of changing the apparent color of the iris of a person wearing the lens and imparting a very natural appearance.

2. The lens of claim 1, wherein the maximum distance of the jagged border from the outer perimeter is from about 60% to about 80% of the radial width of the iris section.

3. The lens of claim 1, wherein the pattern elements of the first shade are located on a substantial portion of the area of the iris section.

4. The lens of claim 1, wherein the third shade is located at least at the outer perimeter of the iris section.

5. The lens of claim 1, wherein the pattern is printed on the lens with ink having a binding polymer.

6. A hydrophilic colored contact lens comprising:
a non-opaque pupil section, a generally annular iris section surrounding the pupil section, and a non-opaque peripheral section surrounding the iris section, the iris section having a colored, printed, opaque, intermittent pattern of elements covering at least about 25 percent of the area of the iris section, the pattern leaving a portion of the iris section non-opaque within interstices of the patter, the non-opaque portion of the iris section including generally radially elongated areas, the intermittent pattern extending across the entire area of the iris section, the iris section having an outer perimeter and an inner perimeter, and including pattern elements of a first shade, pattern elements of a second shade located generally at or near the inner perimeter of the iris section, and a jagged border zone generally along an interface of the pattern elements of the first and second shades, the iris section also including pattern elements of a third shade, wherein the pattern is printed on the lens with ink having a binding polymer, wherein some of the pattern elements of the first shade are mixed with the pattern elements of the second shade, and a noticeable change of shade occurs across the jagged border zone, wherein the minimum distance of the jagged border zone from the outer perimeter is from about 5% to about 45% of the radial width of the iris section, and the maximum distance of the jagged border zone from the outer perimeter is from about 45% to about 95% of the radial width of the iris section, wherein the elements of the pattern are indiscernible to the ordinary viewer, and wherein the lens is capable of changing the apparent color of the iris of a person wearing the lens and imparting a very natural appearance.

7. The lens of claim 6, wherein the binding polymer includes functional groups selected from —COOH, —H, and —NH$_2$.

8. A hydrophilic colored contact lens comprising:

a non-opaque pupil section, a generally annular iris section surrounding the pupil section, and a non-opaque peripheral section surrounding the iris section, the iris section having a colored, printed, opaque, intermittent pattern of elements covering at least about 25 percent of the area of the iris section, the pattern leaving a portion of the iris section non-opaque within interstices of the pattern, the non-opaque portion of the iris section including generally radially elongated areas, the intermittent pattern extending across the entire area of the iris section, the iris section having an outer perimeter and an inner perimeter, and including pattern elements of a first shade, pattern elements of a second shade located generally at or near the inner perimeter of the iris section, and pattern elements of a third shade, the pattern elements comprising ink having a binding polymer, wherein the iris section includes a jagged border zone generally along an interface of the pattern elements of the first and second shades, wherein some of the pattern elements of the first shade are mixed with the pattern elements of the second shade, and a noticeable change of shade occurs across the jagged border zone, wherein the minimum distance of the jagged border zone from the outer perimeter is from about 5% to about 45% of the radial width of the iris section, and the maximum distance of the jagged border zone from the outer perimeter is from about 45% to about 95% of the radial width of the iris section, wherein the elements of the pattern are indiscernible to the ordinary viewer, and wherein the lens is capable of changing the apparent color of the iris of a person wearing the lens and imparting a very natural appearance.

9. The lens of claim 8, wherein the binding polymer includes functional groups selected from —COOH, —OH, and —NH$_2$.

10. The lens of claim 8, wherein the hydrophilic lens is unhydrated.

11. The lens of claim 8, wherein the hydrophilic lens is hydrated after the colored, opaque, intermittent pattern of elements is printed on the lens.

* * * * *